United States Patent
Jongsma et al.

(10) Patent No.: US 11,735,839 B2
(45) Date of Patent: Aug. 22, 2023

(54) RING-STYLE TERMINAL BLOCK AND SUBMERSIBLE PUMP WITH RING-STYLE TERMINAL BLOCK

(71) Applicant: Pentair Flow Technologies, LLC, Delavan, WI (US)

(72) Inventors: Barry Jongsma, Olathe, KS (US); Kolton Stimpert, Kansas City, MO (US); Greg Gutwein, Shawnee, KS (US)

(73) Assignee: Pentair Flow Technologies, LLC, Delavan, WI (US)

( * ) Notice: Subject to any disclaimer, the term of this patent is extended or adjusted under 35 U.S.C. 154(b) by 0 days.

(21) Appl. No.: 17/000,547

(22) Filed: Aug. 24, 2020

(65) Prior Publication Data
US 2020/0388942 A1    Dec. 10, 2020

Related U.S. Application Data

(62) Division of application No. 16/051,104, filed on Jul. 31, 2018, now Pat. No. 10,756,459.

(60) Provisional application No. 62/539,385, filed on Jul. 31, 2017.

(51) Int. Cl.
| | |
|---|---|
| *H01R 9/24* | (2006.01) |
| *F04D 13/08* | (2006.01) |
| *H02K 5/22* | (2006.01) |
| *F04D 13/06* | (2006.01) |

(52) U.S. Cl.
CPC ........... *H01R 9/2416* (2013.01); *F04D 13/08* (2013.01); *H02K 5/225* (2013.01); *F04D 13/0693* (2013.01); *F04D 13/086* (2013.01)

(58) Field of Classification Search
CPC ... H01R 9/2416; F04D 13/08; F04D 13/0693; F04D 13/086
USPC ......................................................... 439/719
See application file for complete search history.

(56) References Cited

U.S. PATENT DOCUMENTS

| | | | |
|---|---|---|---|
| 1,003,323 A | 9/1911 | Bennett | |
| 1,015,358 A | 1/1912 | Suess | |
| 2,604,584 A * | 7/1952 | Scoville | H05K 7/02 361/817 |
| RE23,921 E | 7/1955 | Scoville | |
| 3,145,317 A * | 8/1964 | Blohm | H02K 3/505 310/43 |
| 3,725,707 A * | 4/1973 | Leimbach | H02K 3/522 29/605 |
| 4,476,407 A * | 10/1984 | Hildebrandt | H02K 5/225 200/80 R |

(Continued)

OTHER PUBLICATIONS

International Search Report and Written Opinion, International Application No. PCT/US2018/044648, dated Oct. 17, 2018, 8 pages.

*Primary Examiner* — Alexander Gilman
(74) *Attorney, Agent, or Firm* — Husch Blackwell LLP

(57) ABSTRACT

Embodiments of the invention provide an electrically-powered submersible pump. The pump has a pump housing, a ring-style terminal block including an annular component having a plurality of terminals, a motor contained within the pump housing, and a power source in communication with at least one of the plurality of terminals. Each of the plurality of terminals is spaced apart about the annular component and at least one terminal of the plurality of terminals extends outwardly from the annular component. The motor in communication with at least one of the plurality of terminals.

20 Claims, 10 Drawing Sheets

(56) References Cited

U.S. PATENT DOCUMENTS

| | | | |
|---|---|---|---|
| 4,585,964 A | 4/1986 | Hildebrandt | |
| 6,144,134 A | 11/2000 | Lin | |
| 6,278,206 B1 | 8/2001 | Yockey et al. | |
| 6,856,055 B2 | 2/2005 | Michaels et al. | |
| 6,909,208 B2 | 6/2005 | Suzuki et al. | |
| 7,135,793 B2 | 11/2006 | Seguchi et al. | |
| 7,193,345 B2 | 3/2007 | Shinzaki et al. | |
| 7,518,853 B2 * | 4/2009 | Kato | H02K 3/522 310/71 |
| 7,663,285 B2 | 2/2010 | Yumoto et al. | |
| 7,709,982 B2 | 5/2010 | Ohuchi et al. | |
| 7,755,231 B2 | 7/2010 | Kataoka et al. | |
| 7,830,051 B2 | 11/2010 | Kataoka et al. | |
| 7,851,955 B2 | 12/2010 | Yamamoto et al. | |
| 7,872,383 B2 | 1/2011 | Dubuc et al. | |
| 8,035,264 B2 * | 10/2011 | Kobayashi | H02K 3/525 310/71 |
| 8,046,913 B2 * | 11/2011 | Lee | H02K 3/522 264/328.3 |
| 8,120,216 B2 | 2/2012 | Sakata | |
| 8,350,427 B2 * | 1/2013 | Sugiyama | H02K 3/522 310/43 |
| 8,450,898 B2 | 5/2013 | Sears et al. | |
| 8,816,550 B2 * | 8/2014 | Kim | B62D 5/0403 310/43 |
| 8,922,079 B2 * | 12/2014 | Egami | H02K 3/28 310/71 |
| 8,922,080 B2 * | 12/2014 | Nakagawa | H01R 43/16 310/71 |
| 9,093,876 B2 * | 7/2015 | Knapp | H02K 5/132 |
| 9,293,844 B2 | 3/2016 | Wing et al. | |
| 9,331,539 B2 * | 5/2016 | Arai | H02K 15/00 |
| 9,337,700 B2 | 5/2016 | Patel et al. | |
| D758,317 S | 6/2016 | Plassiard et al. | |
| 9,362,796 B2 | 6/2016 | Tomita et al. | |
| 9,472,996 B2 | 10/2016 | Hochstetler et al. | |
| 9,484,647 B2 | 11/2016 | Ishikawa et al. | |
| 9,543,671 B2 | 1/2017 | Matsuzaki et al. | |
| 9,543,672 B2 | 1/2017 | Imai | |
| 9,735,639 B2 * | 8/2017 | Shim | H02K 3/522 |
| 9,812,918 B2 * | 11/2017 | Andrieux | H02K 5/225 |
| 9,819,240 B2 * | 11/2017 | Hashimoto | H02K 3/28 |
| 9,882,294 B1 * | 1/2018 | Jeong | H01R 4/44 |
| 9,954,408 B2 * | 4/2018 | Nakamura | H02K 3/522 |
| 9,979,249 B2 * | 5/2018 | Fukunaga | H02K 15/0056 |
| 9,997,972 B2 | 6/2018 | Houzumi et al. | |
| 10,312,764 B2 * | 6/2019 | Yuan | H02K 3/38 |
| 10,547,228 B2 * | 1/2020 | Kong | H02K 5/225 |
| 10,601,276 B2 * | 3/2020 | Rauch | H02K 3/38 |
| 10,756,459 B2 * | 8/2020 | Jongsma | H01R 9/2416 |
| 10,790,626 B2 * | 9/2020 | Lee | H02K 5/225 |
| 2002/0000760 A1 | 1/2002 | Lau | |
| 2003/0090166 A1 * | 5/2003 | Kobayashi | H02K 3/522 310/144 |
| 2003/0094879 A1 * | 5/2003 | Kobayashi | H02K 15/0062 310/238 |
| 2003/0173842 A1 | 9/2003 | Kobayashi et al. | |
| 2004/0070293 A1 | 4/2004 | Kabasawa et al. | |
| 2004/0119350 A1 * | 6/2004 | Miya | H02K 3/522 310/71 |
| 2005/0189828 A1 | 9/2005 | Nakayama et al. | |
| 2008/0290978 A1 | 11/2008 | Yamamoto et al. | |
| 2009/0039720 A1 * | 2/2009 | Tsukashima | H02K 5/225 310/71 |
| 2010/0060090 A1 * | 3/2010 | Sakata | H02K 3/522 310/71 |
| 2010/0201213 A1 * | 8/2010 | Kataoka | H02K 11/21 310/71 |
| 2011/0198952 A1 | 8/2011 | Nakamura et al. | |
| 2013/0023165 A1 | 1/2013 | Sasahara et al. | |
| 2013/0106250 A1 * | 5/2013 | Kanada | H02K 7/006 310/67 R |
| 2013/0183178 A1 | 7/2013 | Bottan | |
| 2013/0257200 A1 * | 10/2013 | Nakayama | H02K 5/225 310/71 |
| 2013/0328426 A1 * | 12/2013 | Jang | H02K 3/522 310/71 |
| 2015/0021014 A1 * | 1/2015 | Hughes | E21B 47/01 166/250.01 |
| 2015/0076944 A1 * | 3/2015 | Shim | H02K 3/28 310/71 |
| 2015/0300138 A1 * | 10/2015 | Michel | E21B 34/10 166/372 |
| 2016/0024854 A1 * | 1/2016 | Clingman | H01R 13/6215 439/587 |
| 2016/0130923 A1 * | 5/2016 | Nowitzki | F04D 29/086 166/66.4 |
| 2016/0372994 A1 * | 12/2016 | Knapp | E21B 43/128 |
| 2017/0104281 A1 * | 4/2017 | Kurono | H02K 3/522 |
| 2017/0187177 A1 * | 6/2017 | Mangum | H02G 15/02 |
| 2017/0330647 A1 * | 11/2017 | Xiao | H01B 7/046 |
| 2018/0316238 A1 * | 11/2018 | Kong | H02K 11/33 |
| 2018/0337470 A1 * | 11/2018 | Cerka | B62H 3/12 |
| 2019/0036242 A1 * | 1/2019 | Jongsma | H01R 9/2416 |
| 2019/0083720 A1 * | 3/2019 | Leadley | A61M 15/06 |
| 2022/0065081 A1 * | 3/2022 | Wrighton | F04D 13/0626 |
| 2022/0166286 A1 * | 5/2022 | Yang | H01R 9/2416 |

* cited by examiner

RING-STYLE TERMINAL BLOCK AND SUBMERSIBLE PUMP WITH RING-STYLE TERMINAL BLOCK

CROSS-REFERENCES TO RELATED APPLICATIONS

This application is a division of U.S. patent application Ser. No. 16/051,104, filed on Jul. 31, 2018, which claims priority to U.S. Provisional Patent Application No. 62/539,385, filed on Jul. 31, 2017, entitled "Ring-Style Terminal Block and Submersible Pump with Ring-Style Terminal Block," the entire contents of which are incorporated herein by reference.

BACKGROUND

Electric motors (e.g., induction and synchronous motors) typically include a stator and a rotor. The stator is mounted inside a housing and the rotor is received within the stator. The stator is connected to a power source, which can provide an alternating current to the stator to produce electromagnetic fields that drive rotation of the rotor relative to the stator.

In many stator designs (and electrical machine designs, generally) multiple electrical wires must be connected to a power source. Sensors, if present in the system, may need to be connected to control wires that communicate with equipment external from the electric machine. In order to make the necessary connections to external cables and decrease manufacturing complications, terminal boards have been used.

Terminal boards provide a series of electrically-conducting terminals that can receive multiple individual wires at a common terminal. When multiple wires are coupled to a common, electrically-conducting terminal, the wires are in electrical communication with one another. Terminal boards of this type have reduced the complexity and labor costs associated with installing and assembling electrical machines, as electrical connections between multiple wires can be created without placing each individual electrical wire in direct physical contact with another electrical wire.

Terminal boards have also been used to create electrical connections to motor stators. Simultaneously, the terminal board can act as a seal to the motor cavity. Wires leading from the stator and other equipment within the motor cavity are coupled to terminals extending from the terminal board inward toward the motor cavity. The exterior power source can be connected to common terminals that extend outward from the terminal board away from the motor cavity, which places the stator in electrical communication with the power source while sealing the motor cavity.

Traditionally, vertical terminal boards have been used to connect wires to the terminal boards. Electrical wires running vertically (e.g., parallel to the direction of the terminals) toward the terminals on a vertical terminal board must be bent in order to make adequate connections with the terminals. Bending wires increases the likelihood that a bad connection will be made, which can negatively impact operation of the electric machine. The vertical terminal boards also make electrical machines more difficult to assemble and disassemble, which can increase maintenance and labor costs.

SUMMARY OF THE INVENTION

Embodiments of the invention provide a terminal board that improves the reliability of electrical connections made between a motor stator and a power source, while simultaneously eliminating many of the difficulties associated with installing, maintaining, and troubleshooting traditional terminal boards with vertical terminals.

Some embodiments of the invention provide an electrically-powered submersible pump. The pump has a pump housing, a ring-style terminal block including an annular component having a plurality of terminals, a motor contained within the pump housing, and a power source in communication with at least one of the plurality of terminals. Each of the plurality of terminals is spaced apart about the annular component and at least one terminal of the plurality of terminals extends outwardly from the annular component. The motor in communication with at least one of the plurality of terminals.

Some embodiments of the invention provide an electrically-powered submersible pump. The pump has a pump housing, a motor contained within the pump housing, and a ring-style terminal block. The ring-style terminal block includes an annular component having a plurality of terminals, a top surface, a bottom surface opposite the top surface, and at least one mounting feature. Each one of the plurality of terminals is spaced apart circumferentially and at least one terminal of the plurality of terminals extends outwardly from the annular component. The mounting feature includes a cylindrical through hole extending from the top surface of the annular component through the bottom surface of the annular component.

Some embodiments of the invention provide a submersible pump including a pump housing defined by a motor housing and a terminal housing, a power cable, and a ring-style terminal block including an annular component having a plurality of terminals. At least part of the power cable extends substantially vertically through the terminal housing. The ring-style terminal block is coupled to the motor housing such that the plurality of terminals extend outwardly from the annular component substantially perpendicularly to the at least part of the power cable extending substantially vertically through the terminal housing.

These and other features of the invention will become more apparent from the following description of the illustrative embodiments.

Figure 1:
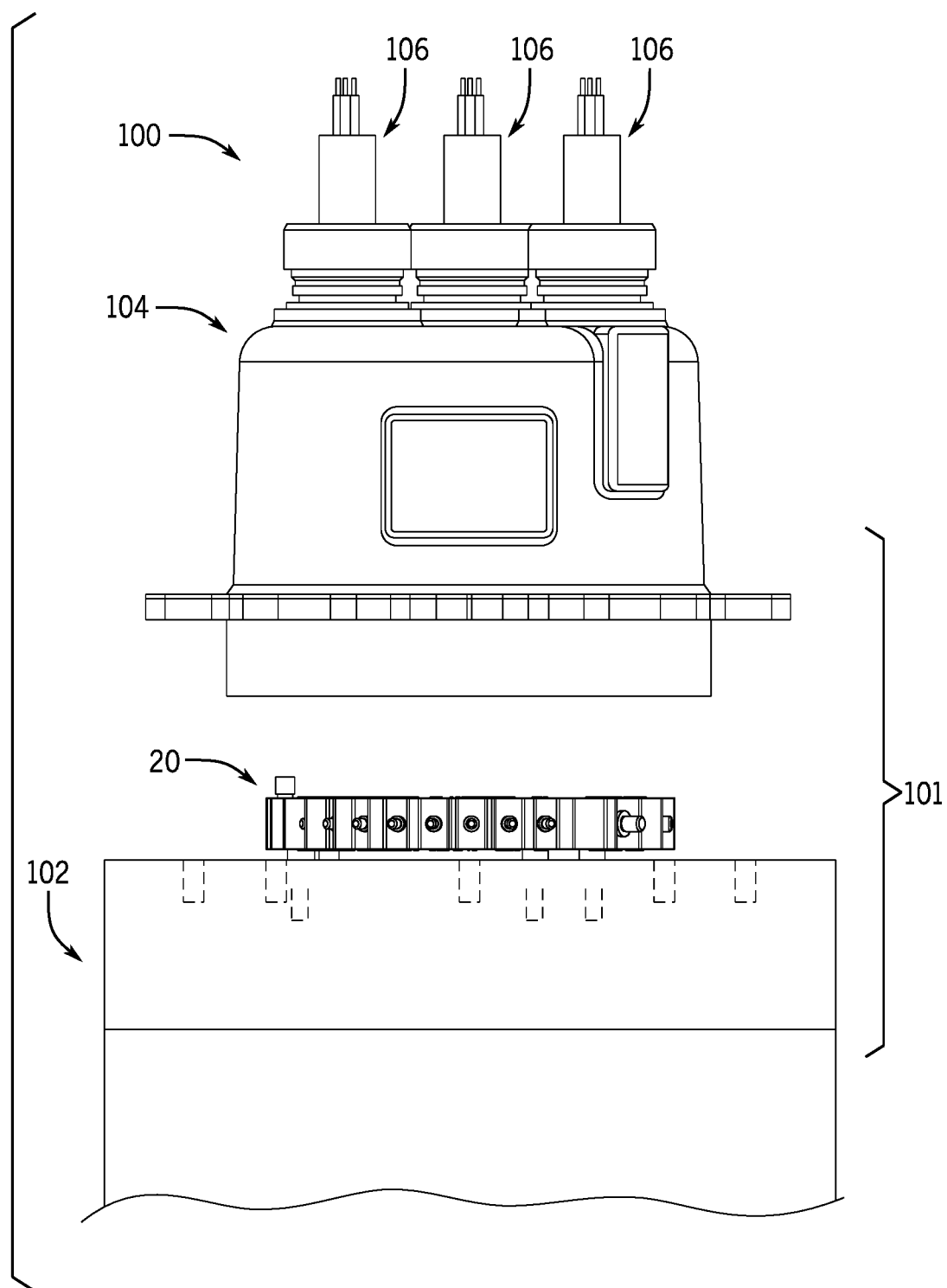
FIG. 1 is a front elevational assembly view depicting a ring-style terminal block within a submersible pump, according to embodiments of the invention.

Corresponding reference characters indicate corresponding parts throughout the several views. Although the drawings represent embodiments of the invention, the drawings are not necessarily to scale and certain features may be exaggerated in order to better illustrate and explain the embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 6:
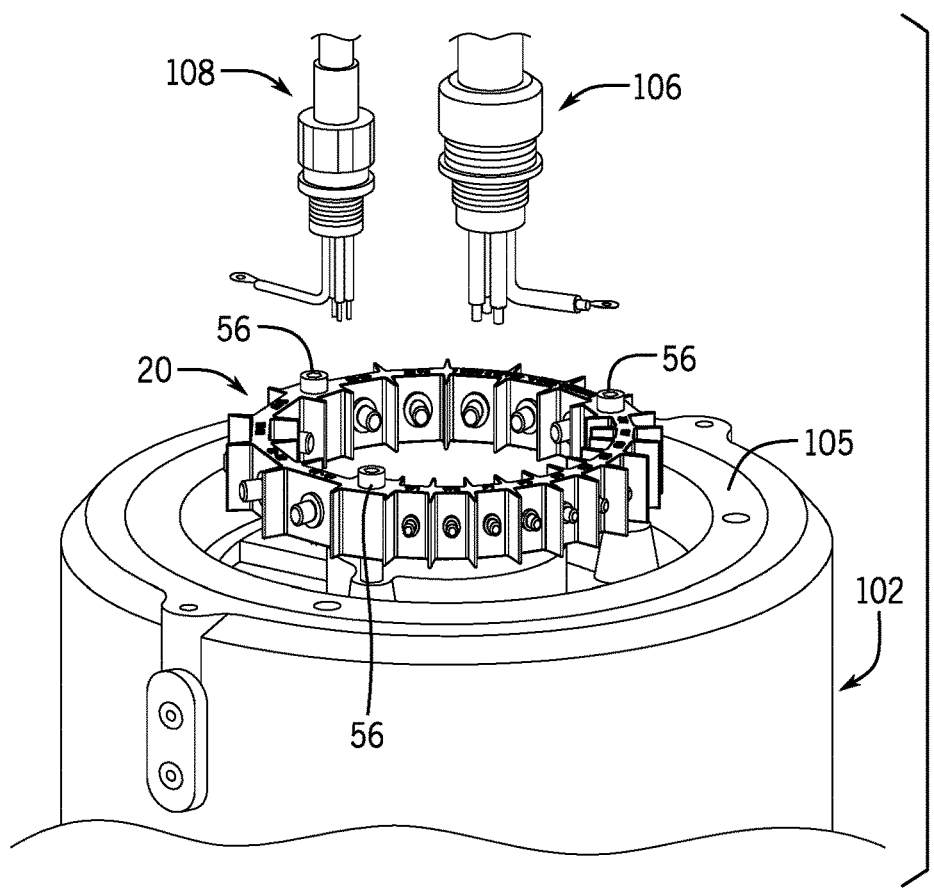
FIG. 6 is a top isometric view of the ring-style terminal block of FIG. 2 located within the submersible pump of FIG. 1, with a pump terminal housing removed.

FIG. 1 illustrates a partially assembled submersible pump 100. The submersible pump 100 includes a pump housing 101, which is defined by a motor housing 102 and a terminal housing 104. A ring-style terminal block 20 is installed within the pump housing 101 to create electrical communication between electrical components (not shown) contained within the motor housing 102 and power cables 106 and control cables (108, shown in FIG. 6) contained within the terminal housing 104. The power cables 106 and control cables 108 extend from the terminal block 20 through the terminal housing 104 and lead away from the submersible pump 100. The power cables 106 and control cables 108 can be connected to exterior electrical components (e.g., sensors) or power sources (e.g., a 110 Volt, 230 Volt, or 460 Volt AC power source), for example.

Figure 2:
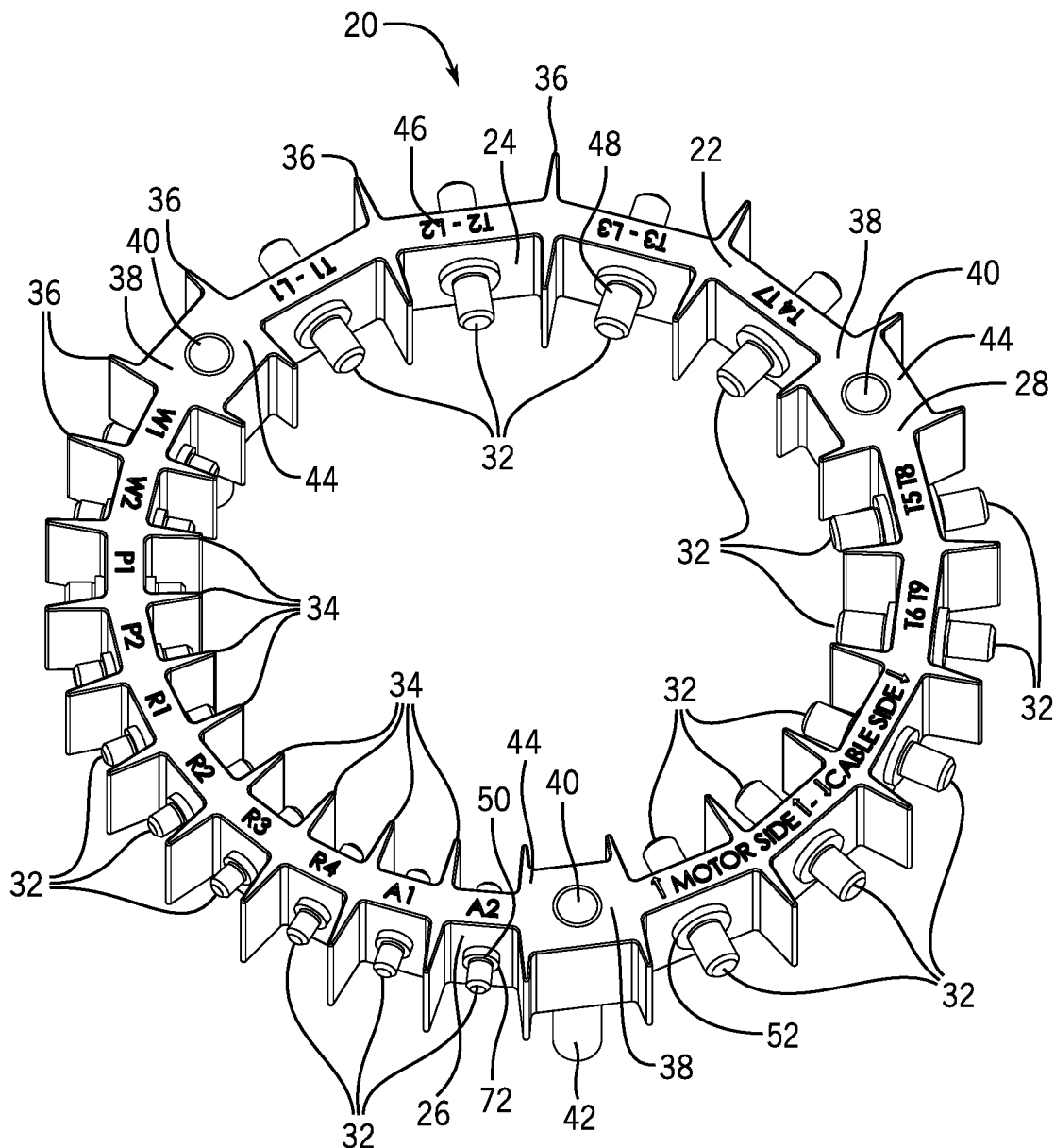
FIG. 2 is a top isometric view of an exemplary ring-style terminal block for use in the submersible pump of FIG. 1.
Figure 3A:
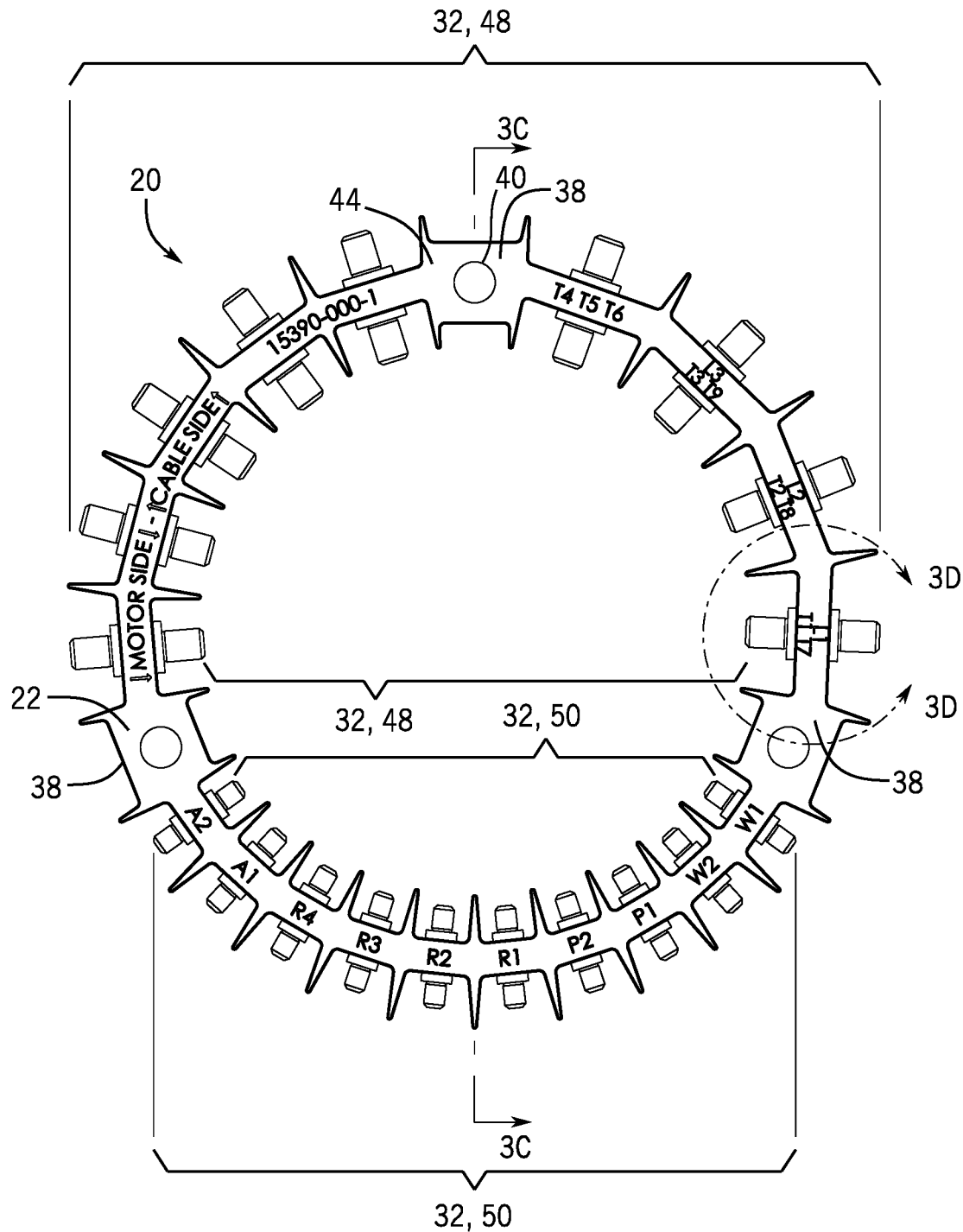
FIG. 3A is top plan view of the ring-style terminal block of FIG. 2.
Figure 3B:
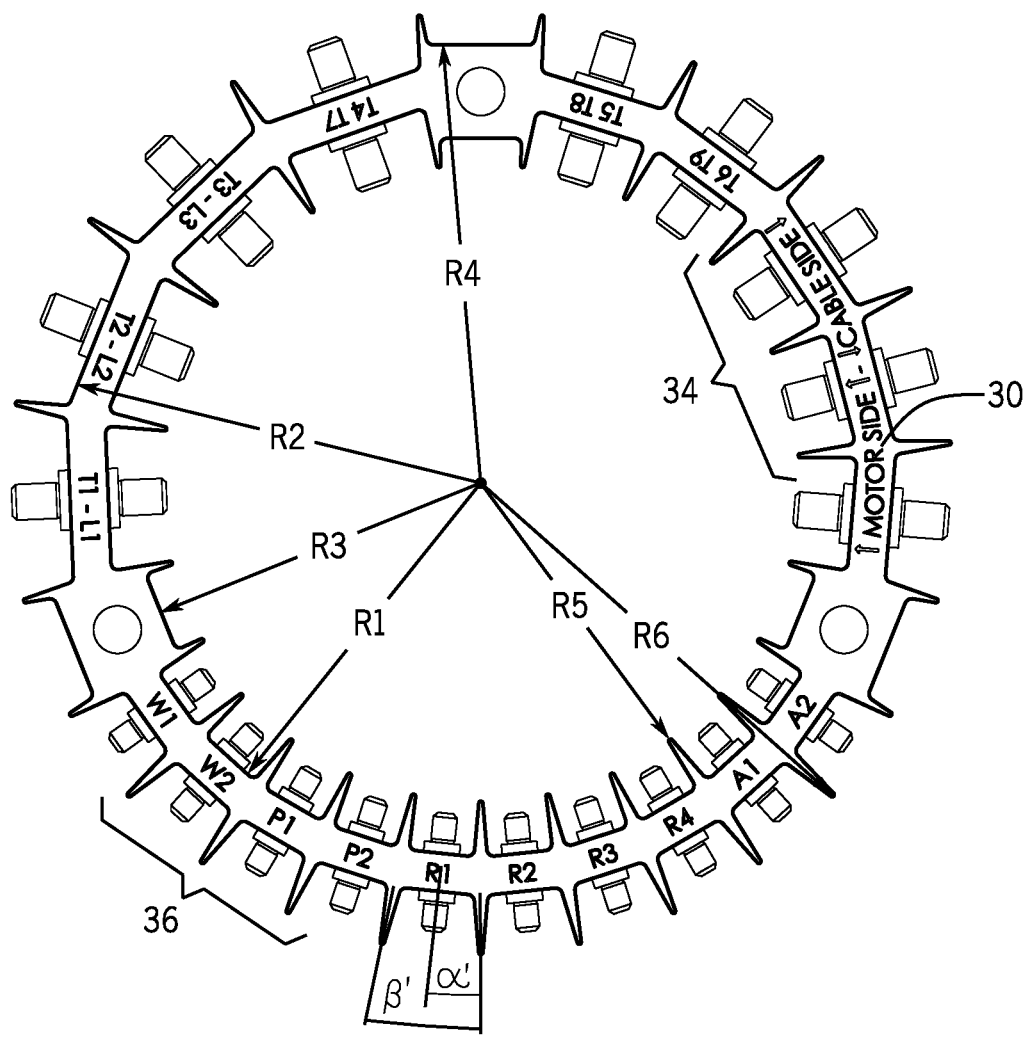
FIG. 3B is a bottom plan view of the ring-style terminal block of FIG. 2.
Figure 3D:
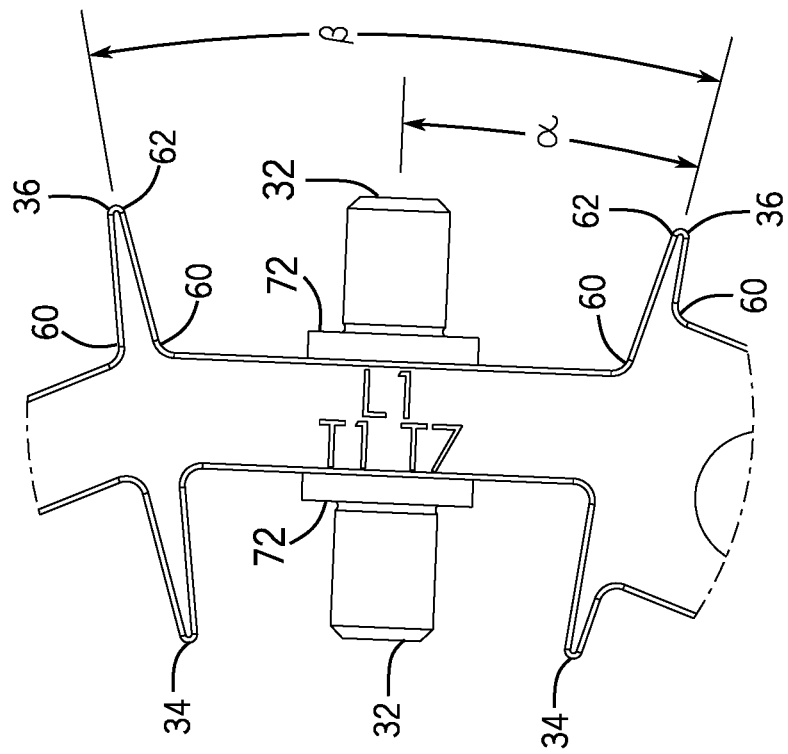
FIG. 3D is a detailed view of the ring-style terminal block of FIG. 2, taken from the circle labeled FIG. 3D in FIG. 3A.
Figure 3C:
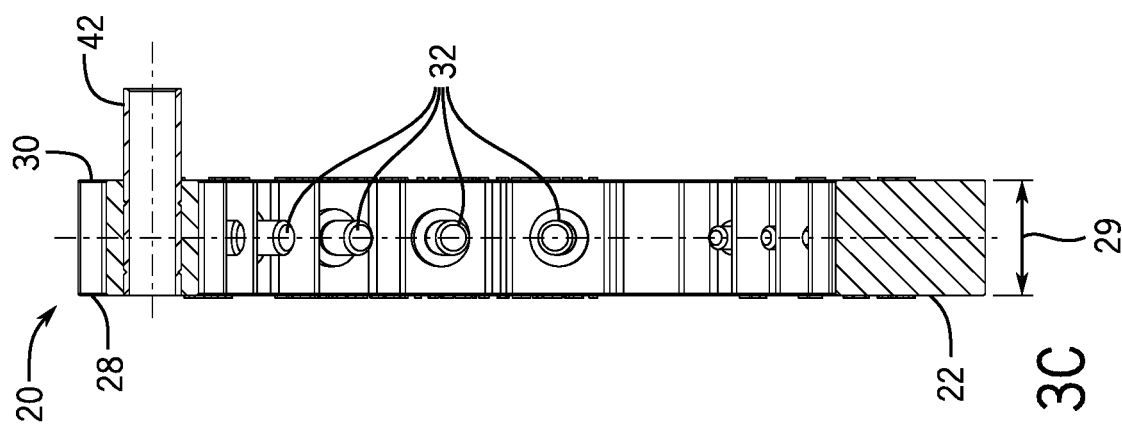
FIG. 3C is a cross-sectional view of the ring-style terminal block of FIG. 2, where the cross-section is taken generally along the lines 3C-3C in FIG. 3A.

FIGS. 2-3D illustrate details of the terminal block 20. The terminal block 20 has an annular component 22 that supports terminals 32, which are spaced apart circumferentially about the annular component 22. The annular component 22 has a radially inward facing surface 24 at least partially defined by a radius R1 and a radially outward facing surface 26 at least partially defined by a radius R2 larger than and concentric with the radius R1, as shown in FIG. 3B. The annular component 22 is further defined by a top surface 28 extending between the radially inward facing surface 24 and the radially outward facing surface 26, as well as a bottom surface 30 extending between the radially inward facing surface 24 and the radially outward facing surface 26, opposite the top surface 28. The radially inward facing surface 24, the radially outward facing surface 26, the top surface 28, and the bottom surface 30 collectively define the exterior shape of the annular component 22. The distance between the top and bottom surfaces 28, 30 defines a thickness 29 of the annular component 22. The thickness 29 may range between about 5 millimeters and about 100 millimeters, for example. In one embodiment, the thickness 29 is about 30 millimeters. A radial depth of the annular component 22 is defined by the difference between the radius R2 and the radius R1, as illustrated in FIGS. 3B and 3C. As an example, the radius R1 could be between about 40 millimeters and about 200 millimeters, while the radius R2 could be between about 45 millimeters and about 300 millimeters.

Several terminals 32 are formed integrally within the annular component 22. In some examples, the annular component 22 is molded around bronze alloy terminals 32, which extend both inwardly and outwardly from the annular component 22. Alternatively, the terminals 32 can be threaded into the annular component 22 once the annular component 22 has been molded. The annular component 22 can be formed of a semi-crystalline, insulating material, such as polyester, polybutylene terephthalate, or polyethylene terephthalate, for example. In some applications, a VALOX™ material is used to form the annular component 22. The terminals 32 can be spaced apart circumferentially about the annular component 22. Each terminal 32 can be evenly spaced circumferentially about the annular component 22. The spacing between each terminal 32 may vary, however, based upon the intended use for the terminals 32, the electrical machine that the ring-style terminal block is being installed into, or other design factors.

One or more of the terminals 32 extends radially away from the annular component 22. As shown in FIG. 2, several terminals 32 extend radially inward from the radially inward facing surface 24 of the annular component 22. Similarly, several terminals 32 extend radially outward from the radially outward facing surface 26 of the annular component 22. In some embodiments, one group of terminals 32 extends radially inward from the radially inward facing surface 24 of the annular component 22 and a second group of terminals 32 extends radially outward from the radially outward facing surface 26 of the annular component 22. In still other examples, each of the terminals 32 in the first and second groups extend entirely through the annular component 22 and both radially inward from the radially inward facing surface 24 and radially outward from the radially outward facing surface 26 of the annular component 22.

Figure 7:
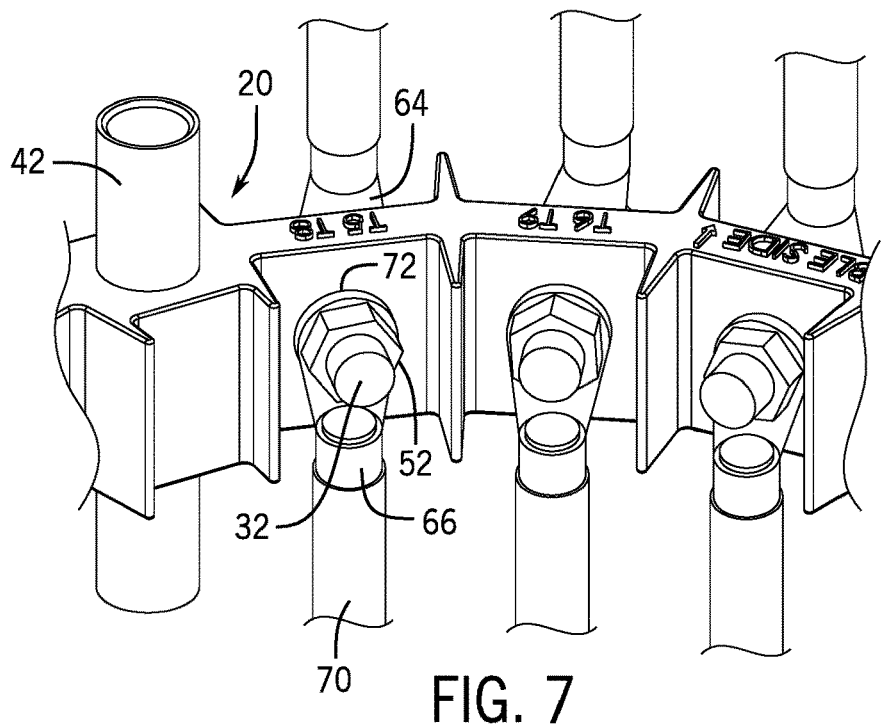
FIG. 7 is a top isometric view of the ring-style terminal block of FIG. 2 having ring tongue connections formed between wires and the terminals on the ring-style terminal block.

A variety of different terminal styles can be used in the terminal block 20. As illustrated, each of the terminals 32 are threaded screw terminals. As shown in FIG. 7, each of the terminals 32 may have a shoulder 72 that extends radially outward from the terminal 32 to form a flat mounting surface for receiving and securing lugs, nuts, or other wire coupling features. In some examples, two or more distinct types or sizes of terminals 32 are present in the terminal block 20. For example, a terminal block 20 may include both power cable terminals 48 and control cable terminals 50. In some embodiments, the power cable terminals 48 are larger and can accept larger electrical connections than the control cable terminals 50. For example, the power cable terminals 48 can accept electrical connections between 2-gauge and 12-gauge, while the control cable terminals 50 support electrical connections between 14-gauge and 18-gauge. Additionally, the power cable terminals 48 can receive and support power cable nuts 52, which can secure electrical connections on the power cable terminals 48, as shown in FIG. 7. Likewise, the control cable terminals 50 can support control cable nuts (not shown). In some embodiments, the power cable nuts 52 and control cable nuts are hex nuts that have interior threads that engage the threaded power cable terminals 48 and control cable terminals 50 that they correspond to. In one example, the power cable nuts 52 have a ⅜" thread size, while the control cable nuts have a #10 thread size. In an alternative embodiment, each of the terminals 32 is a threaded hole formed of electrically conducting material. In these examples, wires extending away from the motor stator and the power source can be coupled to screws that can be threaded into the terminals 32, which then places the wires in electrical communication with one another.

The number and types of terminals 32 in the terminal block 20 can be tailored to individual electrical machine requirements. In one embodiment, the terminal block 20 includes twenty-two total terminals 32, with twelve power cable terminals 48 and ten control cable terminals 50 each extending entirely through the annular component 22. For different machines or different machine sizes, the terminal block 20 could include nine power cable terminals 48, or any other number of power cable or control cable terminals 48, as needed.

Some terminal rings 20 include locating features 46. The locating features 46 can be spaced apart the top surface 28 (or any other suitable surface) of the annular component 22, and may include letters and/or numbers that are molded into the annular component 22. The locating features 46 could be slightly raised from or slightly embedded into the top surface 28 of the annular component 22 to help identify each terminal 32 or to provide other relevant information about the terminal block 20. In some embodiments, both the top surface 28 and the bottom surface 30 include letters or numbers that provide installation instructions or other identifying information. For example, locating features 46 in the form of text on the top surface 28 may provide instructions on how to install and wire the terminal block 20 to a 230 V source, while text-based locating features 46 on the bottom surface 30 may provide instructions on how to install and wire the terminal block 20 to a 460 V source. The locating features 46 can also include other indicia, including shapes, colors, or combinations of any of these, such as the letter and number combination shown. The locating features 46 can be imparted onto the annular component 22 in a number of ways, including drawing, printing, molding, casting, carving, or painting, for example. The locating features 46 can promote easier installation of the terminal block 20 by providing visible notice to the installer of the terminal block 20 and help ensure that proper electrical connections are made at the proper terminals 32. The physical shape and height of the locating features 46 can also be of assistance when the terminal block 20 is located in a position that is difficult to see. Instead of reading, a user can simply feel the locating features 46 to determine a correct connection location for a cable. The locating features 46 can also be color-coded so that the color present on the terminal block 20 corresponds to a color of wire that should be placed in communication with a particular terminal 32, which can further simplify the installation process.

The annular component 22 can include barriers 34, 36 spaced about the annular component 22 to separate the terminals 32. In some embodiments, the radially inward facing surface 24 of the annular component 22 includes a first circumferential array of barriers 34 that each extend radially inward from the radially inward facing surface 24 of the annular component 20. The barriers 34 separate each of the plurality of terminals 32 that extend radially inward from the radially inward facing surface 24. Accordingly, each terminal 32 extending inward from the radially inward facing surface 24 can have at least one barrier 34 placed circumferentially between it and each adjacent terminal 32. Some of the terminals 32 can also be separated from each adjacent terminal 32 by more than one barrier 34. Alternatively, barriers 34 can be omitted in certain locations along the annular component 22, and terminals 32 may be separated by spacing alone. The barriers 34 can be spaced out evenly about the circumference of the radially inward facing surface 24 or could be distributed otherwise to accommodate different electrical machine requirements. For example, the spacing between barriers 34 could be varied to accommodate different terminal sizes, like the power cable terminals 48 and control cable terminals 50 discussed above. Accordingly, the barriers 34 separating power cable terminals 48 could have greater circumferential spacing than barriers 34 separating control cable terminals 50.

The radially outward facing surface 26 of the annular component can include a second circumferential array of barriers 36. Each barrier in the second circumferential array of barriers 36 extends radially outward from the radially outward facing surface 26 of the annular component 22 to separate each adjacent terminal 32 that extends radially outward from the radially outward facing surface 26. More than one barrier 36 can be extend between each set of terminals 32 or, alternatively, terminals 32 may not be separated by barriers 36 at all. Similar to the first circumferential array of barriers 34, the second circumferential array of barriers 36 can be spaced differently to accommodate different terminal 32 sizes. Each of the barriers 34 in the first plurality can be radially aligned with barriers 36 in the second plurality. Accordingly, each of the barriers 34, 36 then extend radially inward and radially outward along a common radius, as shown in FIG. 3D. In some embodiments, the number of barriers 34 and barriers 36 is equal.

The barriers 34, 36 can extend from the bottom surface 30 of the annular component 22 to the top surface 28 to have a barrier 34, 36 depth approximately equal to the thickness 29 of the annular component 22. Each of the barriers 34, 36 can have sections that extend continuously outward from and generally flush with both the top surface 28 and the bottom surface 30 of the annular component 22. Alternatively, each of the barriers 34, 36 can have a barrier depth 34, 36 that is larger than the thickness 29 of the annular component 22.

Each barrier 34, 36 could extend axially beyond one or both of the top surface 28 and the bottom surface 30 of the annular component 22. In still other alternatives, the barriers 34, 36 can have a barrier depth that is less than the thickness 29 of the annular component 22. Accordingly, the barriers 34, 36 can be entirely axially contained between the top surface 28 and the bottom surface 30 of the annular component 22.

In an alternative embodiment, the annular component 22 of the terminal block 20 has two rows of molded terminals 32 stacked circumferentially around the annular component 22. Each of the terminals 32 could extend radially outward or radially inward from the annular component 22, so that all terminals extend outward from a common surface of the annular component. The annular component 22 may include only one of radially inward facing barriers 34 or radially outward facing barriers 36, as terminals extend away from only one of the radially-inward facing surface 24 and the radially-outward facing surface 26 of the annular component 22.

The terminal block 20 can also include one or more mounting features 38. The mounting features 38 can help locate and secure the terminal block 20 within an electrical machine, like the submersible pump 100 shown in FIG. 1. The mounting features 38 can include a cylindrical through hole 40 that extends entirely through the annular component 22 from the top surface 28 of the annular component through the bottom surface 30. Additionally, the mounting features 38 can each include cylindrical steel (or other metallic materials, such as brass or aluminum, for example) inserts 42 coupled to the cylindrical through holes 40 formed in the annular component 22. The cylindrical steel inserts 42 can be molded integrally within the cylindrical through hole 40 or adhesively connected to the cylindrical through-hole 40, for example. As shown in FIG. 2, the cylindrical steel insert 42 may extend beyond the bottom surface 30 of the annular component 22, which can make the terminal block 20 more readily locatable at a desired mounting position within an electric machine. In some embodiments, the cylindrical steel insert 42 extends beyond both the top surface 28 and the bottom surface 30 of the annular component 22. The mounting features 38 can further define a fastener seat 44, which is located on the top surface 28 of the annular component 22.

FIGS. 3A-3D illustrate the dimensional relationships between the terminals 32 and the barriers 34, 36 on the terminal block 20. In some examples, the power cable terminals 48 can each be grouped together, so that each power cable terminal 48 is circumferentially adjacent to at least one other power cable terminal 48. The control cable terminals 50 are also then grouped together, so that each control cable terminal 50 is circumferentially adjacent to at least one other control cable terminal 50. Alternatively, the power cable terminals 48 and control cable terminals 50 can alternate circumferentially about the terminal block 20. The number of power cable terminals 48 and control cable terminals 50 formed within the annular component 22 may not always be equal, so many other terminal 48, 50 positioning patterns are possible.

FIGS. 3A and 3B illustrate example shapes and orientations of the mounting features 38. The mounting features 38 may extend inwardly or outwardly beyond the radially inward facing surface 24 or the radially outward facing surface 26, respectively, and can be defined by radii that differ from radii R1 and R2. For example, the mounting features 38 can jut inwardly from the radially-inward facing surface 24 to a radius R3, which is smaller than R1. The mounting features 38 can extend outwardly from the radially outward facing surface 26 as well. For example, the mounting features 38 can extend outwardly to a radius R4, which is larger than the radius R2. The size difference between radii R1, R2, R3 and R4 forms a fastener seat 44 (shown in FIG. 2). The fastener seat 44 provides a large surface for which a fastener or coupling device may engage and hold a terminal block 20 into place within an electric machine assembly. Although described as being defined by radii R3 and R4, the mounting features 38 may instead be defined by substantially planar walls. For example, the mounting features 38 can be defined by inner and outer walls formed in planes extending approximately tangent to the circles defined by radii R3 and R4, respectively.

The mounting features 38 can be arranged on the terminal block 20 in a variety of orientations about the annular component 22. In some embodiments, three identically-sized mounting features 38 are spaced evenly about the circumference of the annular component 22. The number, size, and position of the mounting features 38 can be adjusted based upon the mounting requirements of the electric machine the terminal block 20 will be installed into.

The barriers 34, 36 can also be at least partially defined by a radius. In some embodiments, each of the barriers 34 extend radially inward to a distance R5 from the center of the annular component 22, which is smaller than and concentric with both radii R1 and R3. Each of the barriers 34 can extend inwardly to the radius R5, for example. Similarly, each of the barriers 36 can extend radially outward from the radially outward facing surface 26 to a distance R6, which is larger than both radii R2 and R4. In other examples, the radius R5 can be larger than or equal to the radius R3, while the radius R6 can be smaller than or equal to the radius R4. Each of the inward-extending barriers 34 can be uniformly shaped, while each of the outward-extending barriers 36 can also be uniformly shaped.

As shown in FIG. 3D, the barriers 34, 36 can have a generally tooth-like shape. The tooth-like shape can be defined by a barrier base 60 and a barrier tip 62. The barrier base 60 can be wider than the barrier tip 62, which gives the barriers 34, 36 an inward taper. Radii can partially define the base 60 and barrier tips 62 to remove sharp corners from the barriers 34, 36. The barrier 34, 36 spacing can be defined by angles α and β. In the illustrative embodiment, angle α is defined as the angle between the centerline of a barrier 36 and the centerline of an adjacent terminal 32. When the barriers 34 and 36 share a common centerline, as shown in FIG. 3D, both barriers 34, 36 are at least partially dependent on angle α. The angle α may vary in magnitude, and can be largely dependent upon the number and size of terminals 32 that are formed integrally within the annular component 22. As illustrated, the angle α is between about 7° and about 9°.

The angle β is defined as the angle between the centerlines of circumferentially adjacent barriers 34, 36. The angle β can be about twice the magnitude of the angle α, so that the terminal 32 centerline is approximately centered between adjacent barriers 34, 36. In terminal blocks 20 having at least two distinct sizes of terminal 32 (e.g., power cable terminals 48 and control cable terminals 50), a second set of angles α' and β' can be used to separate control cable terminals 50, as shown in FIG. 3B. If the angles α' and β' differ from the angles α and β, the angular spacing between barriers 34, 36 is not constant throughout the annular component 22. The second set of angles α' and β' may be smaller than the first set of angles α and β, so that the circumferential spacing of barriers 34, 36 is less between control cable terminals 50 than it is between power cable terminals 48. This provides the larger power cable terminals 48 with a larger space around them, so that the barriers 34, 36 will not overly restrict the type of terminal connection that can be made at the power cable terminals 48.

Figure 4:
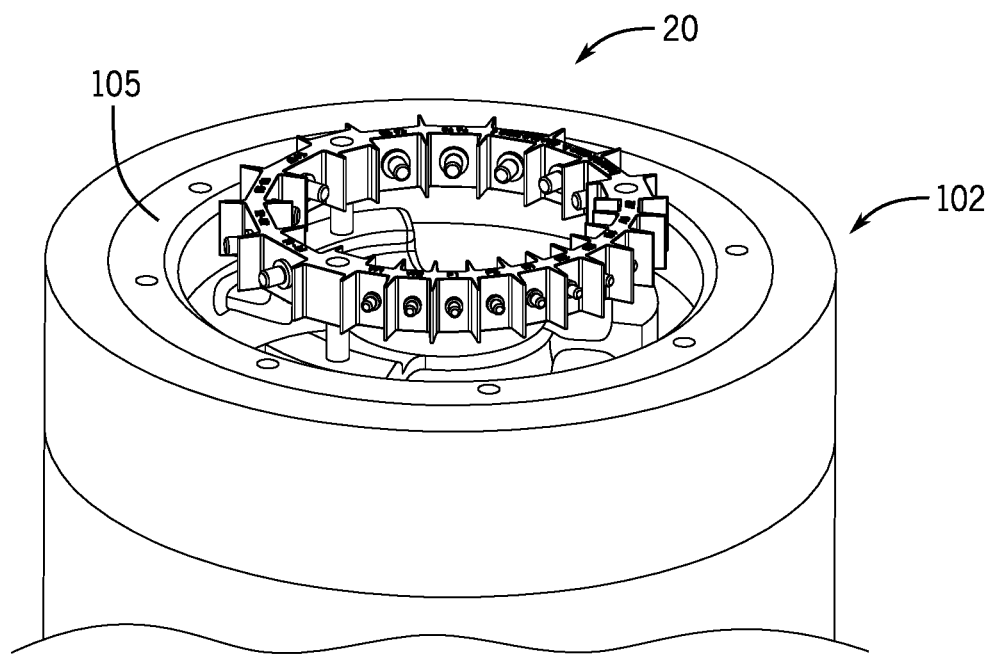
FIG. 4 is a top isometric view of the ring-style terminal block of FIG. 2 installed within the submersible pump of FIG. 1.
Figure 5:
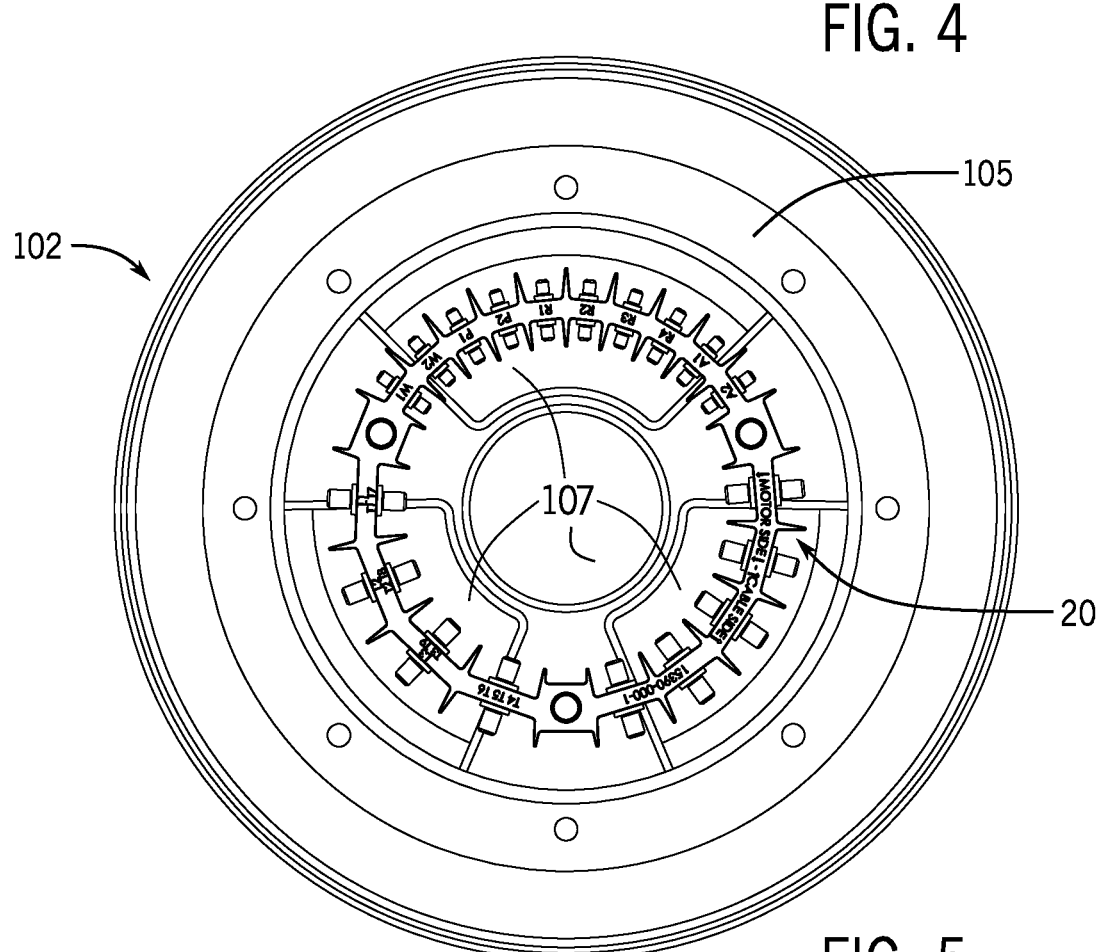
FIG. 5 is a top plan view of the ring-style terminal block of FIG. 2 installed within the submersible pump of FIG. 1.

FIGS. 4-10 illustrate a process 200 for assembling the terminal block 20 into a submersible pump 100. As shown in FIGS. 4-5, the terminal block 20 can be first positioned within the motor housing 102, on top of a bearing plate 105. Counterbored holes can be formed in the bearing plate 105 to receive the cylindrical steel inserts 42 of the mounting features 38 or other anchoring mechanisms. The cylindrical steel inserts 42 extend into the counterbored holes, which locate and secure the terminal block 20 in a proper radial orientation relative to the motor housing 102. In some embodiments, the terminal block 20 is aligned substantially concentrically with a cylindrical outer surface of the pump housing 102. Once the terminal block 20 is positioned within the motor housing 102, anchors 56 (shown in FIG. 6) can been placed through the cylindrical steel inserts 42 (or through the through holes 40, if the cylindrical steel inserts 42 are omitted) and tightened within the threaded counterbored holes in the bearing plate 105 to prevent axial and radial movement of the terminal block 20. The anchors 56 can be tightened to engage the fastener seats 44 formed on the mounting features 38.

Once the terminal block is secured to the motor housing 102, electrical connections between the motor, sensors, and the power source can be created. The bearing plate 105 has designated openings 107 to allow electrical cables contained within the motor housing 102 to extend upward to the terminal block 20, where electrical connections can be made. The terminal housing 104 (which is removed for clarity in FIG. 6) is suspended above the terminal ring 20 at step 202. Electrical power source cables 106 and control connections 108 then extend vertically toward the terminal block, where they can be connected to terminals 32 in the terminal block 20.

Electrical connections are made on the terminal block 20 at step 204. As shown in FIG. 7, wires extending from the motor stator 70 can first be placed in electrical communication with a pump connection 66. In some examples, the pump connection 66 is a ring tongue connector formed of an electrically conducting material and having a through-hole sized to receive a threaded screw terminal 32. If sized properly, the pump connection 66 will provide at least some electrical contact between the terminal 32 and the pump connection 66, so that the wire extending from the motor stator 70 is placed in electrical communication with the terminal 32. A power cable nut 52 can then be threaded onto the terminal 32 and tightened to engage the power cable nut 52, the pump connection 66, and the shoulder 72 together. To speed up the installation process, a torque wrench can be used to tighten the power cable nuts 52. Following the same general process, the power connection 64 can be placed into electrical contact with the terminal 32, again using a power cable nut 52. The same general process can then be used to couple wire connections on the control cables to the terminal ring 20 using control cable nuts. The annular component 22, terminals 32, and wire connections 64, 66 are formed of materials having similar expansion coefficients to avoid loosening between metals and issues with poor contact resistance. As illustrated in FIG. 7, electrical connections coming from the motor housing 102 can be positioned on the portion of the terminal 32 extending radially inward from the radially inward facing surface 24 annular component 22, while connections to exterior control units, as well as power sources are positioned on the portion of the terminal 32 extending radially outward from the radially outward facing surface 26 of the annular component 22. Alternatively, multiple wire connections 64, 66 can be received on the same end of a terminal 32. For example, embodiments of the terminal ring 20 having terminals 32 extending only radially inward from the radially inward facing surface 24 (or alternatively, only radially outward from the radially outward facing surface 26) can receive both of the connections 64, 66 on the same end of the terminal 32, and can each be engaged by a common power cable nut 52 or control cable nut.

Figure 8:
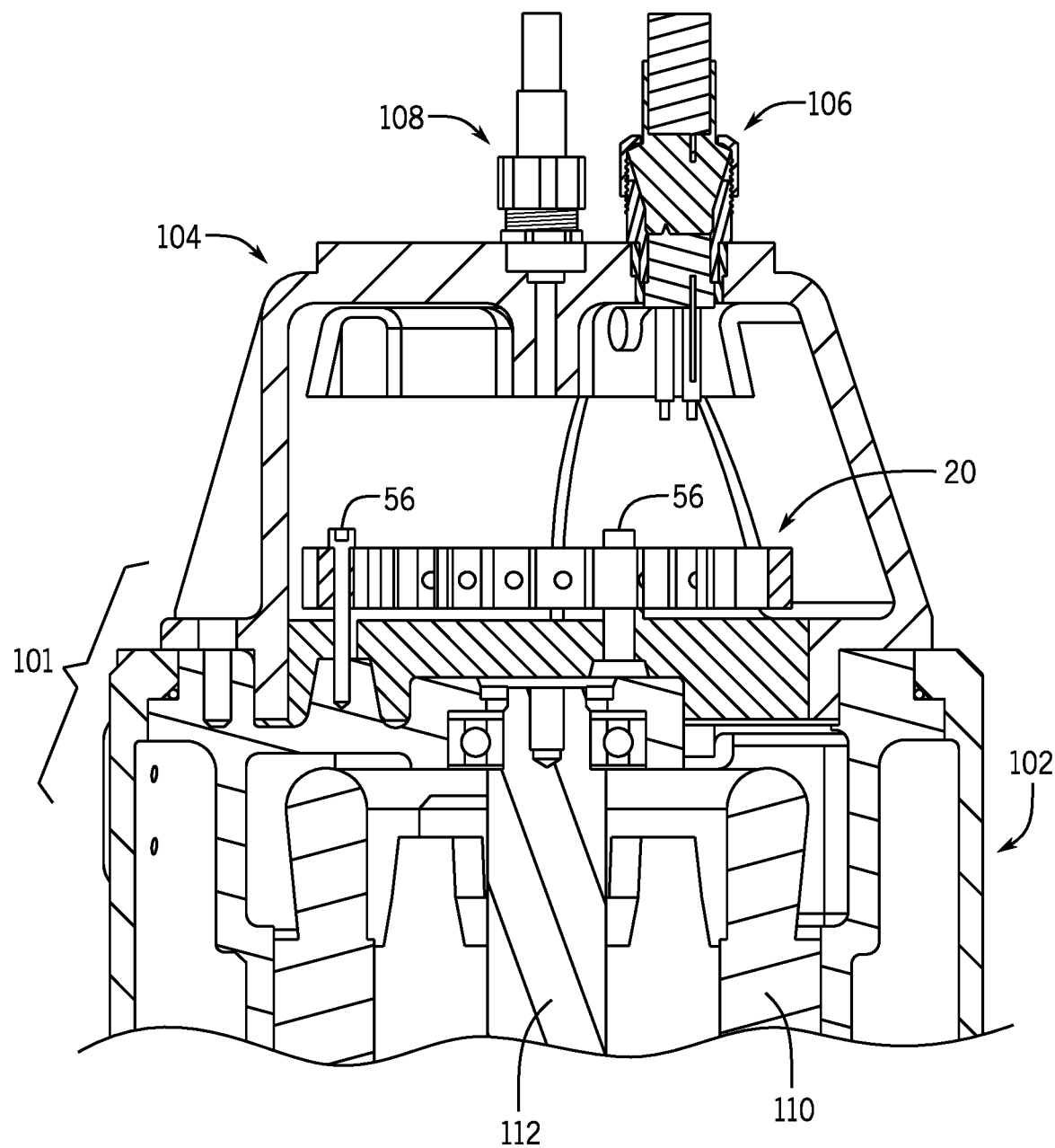
FIG. 8 is a partial cross-sectional view of an assembled submersible pump having the ring-style terminal block of FIG. 2 installed within the pump terminal housing.

Once the wire connections 64, 66 have been coupled to the terminals 32, the terminal housing 104 can be lowered over the motor housing 102 at step 206, as shown in FIG. 8. Once the terminal housing 104 is lowered over the terminal block 20, the terminal block 20 is entirely contained within the pump housing 101. With the electrical connections made at each of the terminals 32, the electrical power source cables 106 can be placed in electrical communication with the power source to drive the pump 100. The pump 100 includes a shaft 112 and an impeller (not shown) coupled to the shaft 100 and used to displace fluid. The terminal housing 104 and the motor housing 102 are then coupled together (e.g., using fasteners) to form a seal at step 208, so that the stator 110 and terminal block 20 remain substantially dry during pump operation.

Figure 9:
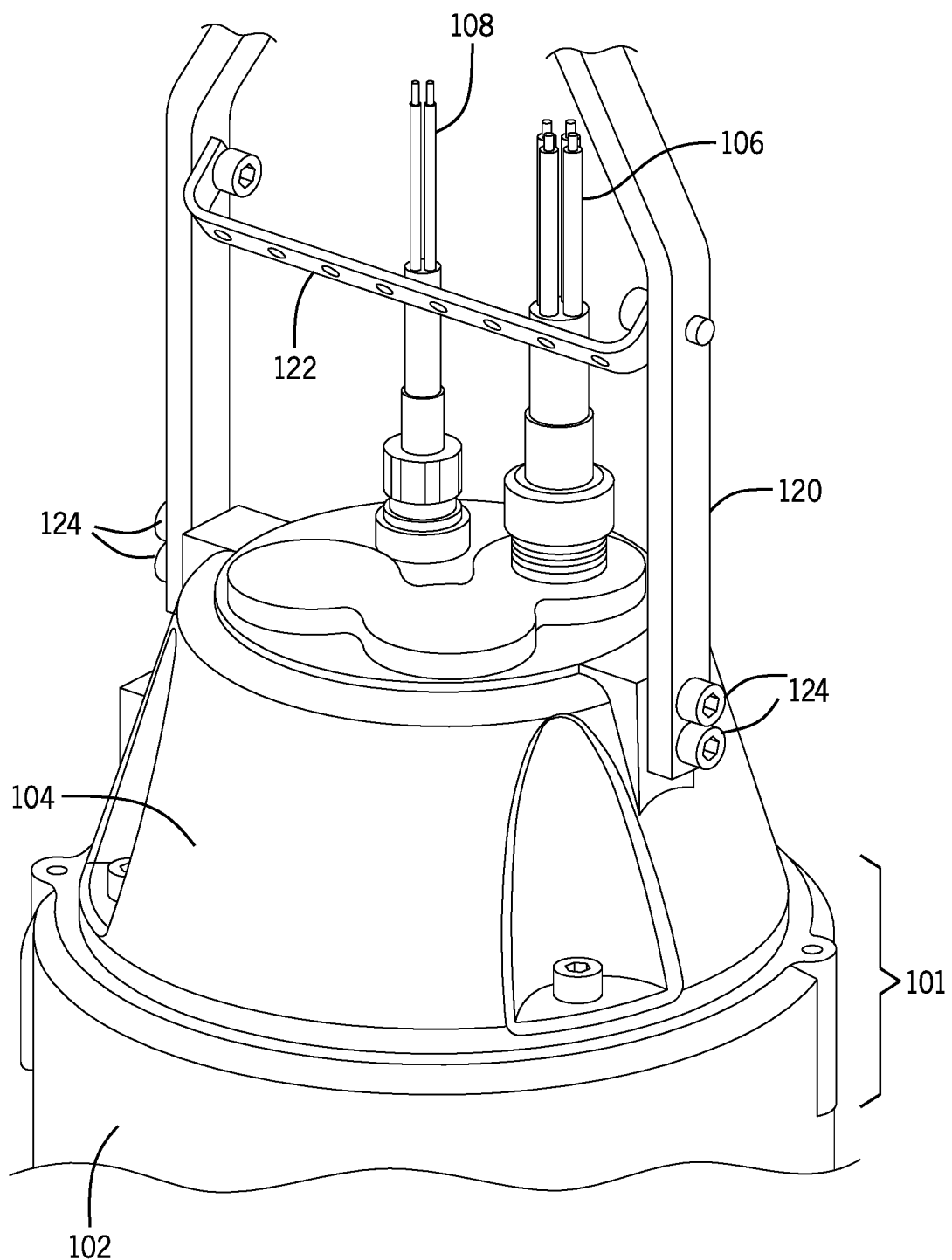
FIG. 9 is a front, top isometric view of a sealed submersible pump having a lifting feature used during a pump assembly process.
Figure 10:
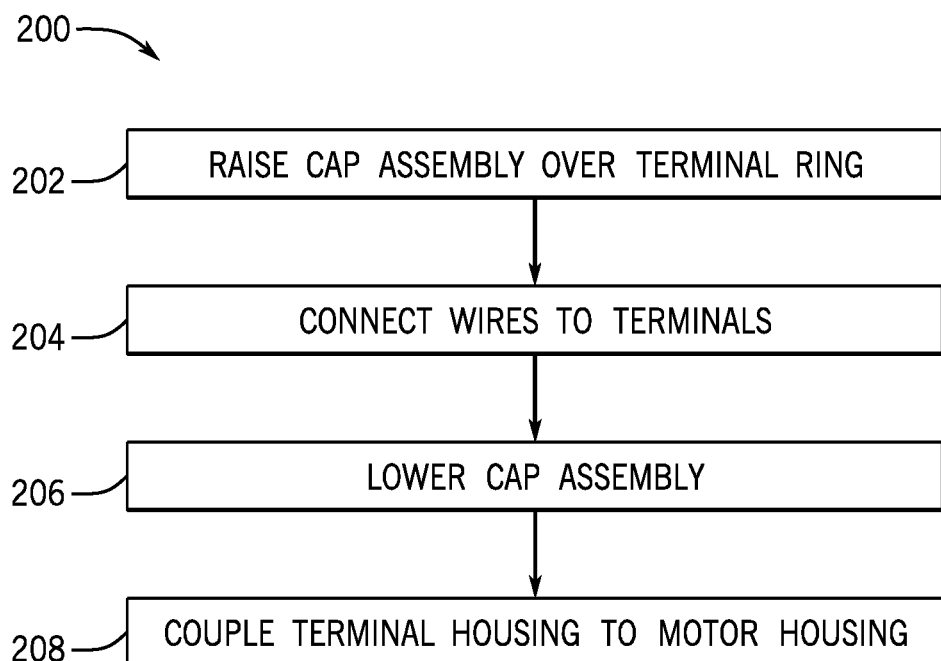
FIG. 10 is a process diagram detailing a method of installing a ring-style terminal block within a submersible pump according to embodiments of the invention.

Once the motor housing 102 and terminal housing 104 are sealingly coupled together, any material handling equipment used during assembly can be removed. As shown in FIG. 9, a lifting device 120 with a cable retaining bracket 122 can be directly coupled to the terminal housing 104. The lifting device 120 is typically used to raise the terminal housing 104 above the motor housing 102 during the wire connection step 204. To properly connect the electrical power source cables 106 and control connections 108 to the terminals 32 of the terminal block 20, the terminal housing 104 is suspended over the terminal block 20 using an overhead lift in connection with the lifting device 120. An installer can make the necessary electrical connections to the terminal block 20, lower the terminal housing 104 onto the motor housing 102, and then remove the lifting device 120 (e.g., by removing the fasteners 124 from the terminal housing).

It will be appreciated by those skilled in the art that while the invention has been described above in connection with particular embodiments and examples, the invention is not necessarily so limited, and that numerous other embodiments, examples, uses, modifications and departures from the embodiments, examples, and uses are intended to be encompassed by the claims attached hereto. Various features and advantages of the invention are set forth in the following claims.

The invention claimed is:

1. An electrically-powered submersible pump, the pump comprising:
   a pump housing;
   a ring-style terminal block including an annular component having a plurality of terminals, each of the plurality of terminals being spaced apart about the annular component, at least one terminal of the plurality of terminals extending outwardly from the annular component;
   a motor contained within the pump housing, the motor in communication with at least one of the plurality of terminals; and
   a power source in communication with at least one of the plurality of terminals.

2. The pump of claim 1, wherein the pump housing includes a terminal housing and a motor housing, the terminal housing and the motor housing coupled together to form a seal around the ring-style terminal block and a stator of the motor.

3. The pump of claim 2, wherein the ring-style terminal block is secured to the motor housing via one or more anchors.

4. The pump of claim 1, wherein the plurality of terminals includes at least two distinct sizes of terminals, one size corresponding to a power cable in communication with the power source.

5. The pump of claim 1, wherein the annular component includes a radially inward facing surface and a radially outward facing surface, the radially inward facing surface is at least partially defined by a first radius and the radially outward facing surface at least partially defined by a second radius larger than the first radius.

6. The pump of claim 5, wherein annular component further includes a top surface extending between the radially inward facing surface and the radially outward facing surface, and a bottom surface extending between the radially inward facing surface and the radially outward facing surface and formed opposite the top surface, the bottom surface separated from the top surface by a thickness.

7. The pump of claim 5, wherein at least one terminal of the plurality of terminals extends radially inward from the radially inward facing surface of the annular component and at least one terminal of the plurality of terminals extends radially outward from the radially outward facing surface of the annular component.

8. The pump of claim 5, wherein the plurality of terminals extend radially inward from the radially inward facing surface, through the annular component, and radially outward from the radially outward facing surface.

9. The pump of claim 5, wherein the radially inward facing surface of the annular component comprises a first circumferential array of barriers extending radially inward from the radially inward facing surface of the annular component to separate each of the plurality of terminals from adjacent terminals.

10. The pump of claim 9, wherein the radially outward facing surface of the annular component comprises a second circumferential array of barriers extending radially outward from the radially outward facing surface of the annular component to separate each of the plurality of terminals from adjacent terminals.

11. The pump of claim 9, wherein each of the first circumferential array of barriers is uniformly shaped.

12. The pump of claim 9, wherein each barrier of the first circumferential array of barriers is axially contained between the top surface and the bottom surface.

13. The pump of claim 10, wherein each barrier of the second circumferential array of barriers is axially contained between the top surface and the bottom surface.

14. An electrically-powered submersible pump, the pump comprising:
a pump housing;
a motor contained within the pump housing; and
a ring-style terminal block including:
an annular component including a plurality of terminals, each one of the plurality of terminals being spaced apart circumferentially, at least one terminal of the plurality of terminals extending outwardly from the annular component,
a top surface,
a bottom surface opposite the top surface, and
at least one mounting feature including a cylindrical through hole extending from the top surface of the annular component through the bottom surface of the annular component.

15. The pump of claim 14, wherein each of the mounting features further includes a cylindrical insert that extends at least partially into the cylindrical through hole, the motor includes a motor housing with a bearing plate, and an anchor extends through each cylindrical insert to secure the ring-style terminal block to the bearing plate.

16. A submersible pump comprising:
a pump housing, including a motor housing and a terminal housing;
a power cable, at least part of the power cable extending substantially vertically through the terminal housing; and
a ring-style terminal block including an annular component having a plurality of terminals, the ring-style terminal block coupled to the motor housing such that the plurality of terminals extend outwardly from the annular component substantially perpendicularly to the at least part of the power cable extending substantially vertically through the terminal housing.

17. The submersible pump of claim 16, wherein the motor housing includes a bearing plate with openings, the submersible pump including a motor cable configured to extend through the bearing plate openings to the ring-style terminal block.

18. The submersible pump of claim 16, wherein a control cable extends substantially vertically through the terminal housing.

19. The submersible pump of claim 16, wherein each of the power cable, a motor cable, and a control cable are in electrical communication with at least one of the plurality of terminals.

20. The submersible pump of claim 16 wherein at least one terminal of the plurality of terminals extends radially inward from a radially inward facing surface of the annular component and at least one terminal of the plurality of terminals extends radially outward from a radially outward facing surface of the annular component,
wherein the power cable is electrically coupled to at least one of the plurality of terminals extending from one of the radially inward facing surface or the radially outward facing surface, and a motor cable is electrically coupled to at least one of the plurality of terminals extending from the other of the radially inward facing surface or the radially outward facing surface.

* * * * *